March 11, 1941.  D. C. HUNGERFORD  2,234,557
ANCHOR NUT
Filed May 24, 1938
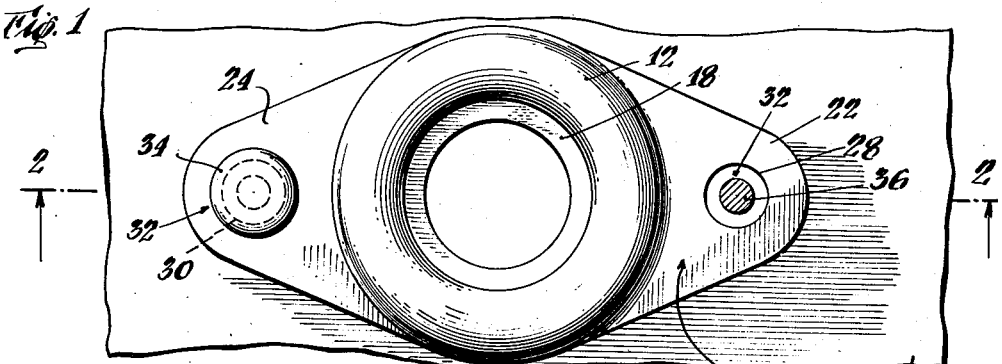
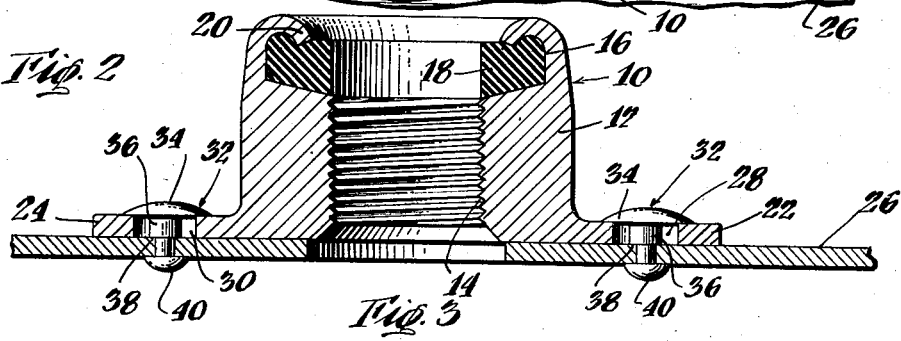
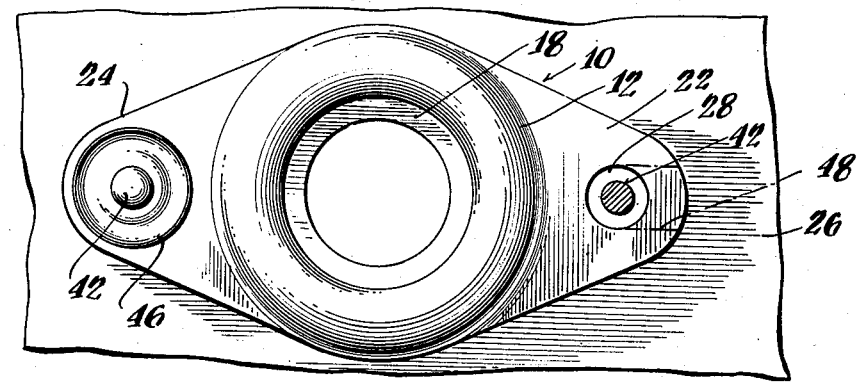
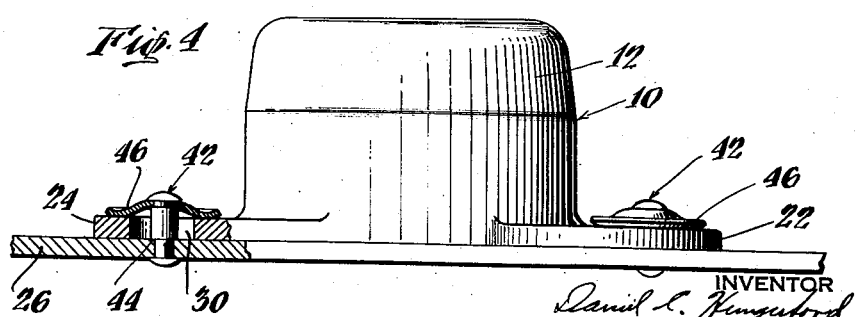
INVENTOR
Daniel C. Hungerford
BY
ATTORNEY Patented Mar. 11, 1941

2,234,557

UNITED STATES PATENT OFFICE 2,234,557

ANCHOR NUT

Daniel C. Hungerford, Madison, N. J., assignor to Elastic Stop Nut Corporation, Elizabeth, N. J., a corporation of New Jersey Application May 24, 1938, Serial No. 209,670

3 Claims. (Cl. 85—32)

The present invention relates to anchor nuts and has particular reference to anchor nuts of the self-locking type.

Anchor nuts and particularly self-locking anchor nuts frequently are utilized for so-called "blind" fastenings, wherein the nut is fastened to one of two parts to be secured together by a bolt and nut connection, in such position as to be inaccessible in an assembled structure.

In constructions of this kind, particularly where two parts are held together by a multiplicity of bolt and nut connections, it is highly desirable and usually a practical necessity, for the nut to have limited lateral movement with respect to the part to which it is secured, in order to enable the several nuts to readily be brought into alignment with the openings or bores which determine the positions of the bolts which engage them. This has heretofore been accomplished by retaining the nuts loosely in some form of nut retaining structure which prevents the nut from rotating and permits it to have limited lateral movement relative to the retaining structure and to the part to which the retaining structure is fastened. Sometimes this nut retaining structure is in the form of a separate anchor member adapted to be permanently and rigidly secured to one of the parts to be fastened and in which the nut is loosely retained and in other instances, the nut is loosely retained against rotation by fingers or other portions of the part to be fastened, punched out to form a nut retaining cage or basket.

The general object of the present invention is to improve upon prior forms of construction for loosely retaining an anchor nut in position with limited lateral movement with respect to a part to be fastened, by the provision of a novel form of anchor nut structure which eliminates disadvantageous features of prior construction. A further object of the invention is to provide improved anchor nut structures which will enable restrained lateral movement of the nut within its sphere of limited movement to readily be obtained.

Other and more detailed objects of the invention and the advantages to be derived from its use may best be understood from a consideration of the ensuing portion of this specification taken in conjunction with the accompanying drawing forming a part hereof.

In the drawing:

Fig. 1 is a top plan view of an anchor nut structure embodying the invention, secured to a plate constituting one of the parts to be secured together by the bolt and nut connection;

Fig. 2 is a section taken on the line 2—2 of Fig. 1;

Fig. 3 is a view similar to Fig. 1, showing another form of structure; and

Fig. 4 is a side elevation partly in section of the structure shown in Fig. 3.

Referring now to the drawing, the anchor nut indicated generally at 10, comprises a main body portion 12 having a threaded bore 14 the upper end of which is recessed as at 16 to receive an unthreaded locking washer 18 of elastic material, which is permanently fixed in place in the nut body, as by crimping over the top flange 20 of the nut body.

From the base of the main body portion 12 of the nut, a flange portion is provided which in the illustrated embodiment consists of two oppositely extending lugs 22 and 24. These are preferably relatively thin in vertical cross section as compared to the total height of the nut and form the means whereby the nut is to be fastened to the part to be secured, such as plate 26. The lugs 20 and 24 are provided respectively with apertures 28 and 30 which are advantageously but not necessarily circular, through which the cooperating fastening elements are to pass. Advantageously these fastening elements are in the form of rivets 32, the heads 34 of which are of such size as to not be capable of passing through the apertures 28 or 30.

In accordance with the principles of the invention, the shank portions 36 of the rivets which pass through the lugs of the nut are of materially smaller diameter than the diameters of the apertures 28 and 30, so that when the rivets are in position substantial lateral play is permitted between the nut and the rivets and consequently, between the nut and the part 26.

In order that this desired play may be ensured, the shanks of the rivets are shouldered as at 38 so as to form abutments adapted to engage the face of the part 26 to which the rivets are fixedly secured by riveting the end portions 40 of the rivet shanks.

Further, by properly relating the length of the portion of the rivet shank between the rivet head and the shoulder 38 to the thickness of the portion of the lug through which the rivet passes, the rivet head 34 can be brought into light pressure engagement with the lug, so that the friction between these parts will act to definitely restrain lateral movement of the nut with respect to the part to which it is secured while at the same time permitting such movement to occur when moderate lateral pressure is applied to the nut after it is secured in place.

When this is done, the adjustment of the position of the nut to center the bore of the nut with respect to the position of the cooperating bolt or stud can be effected and once the adjusted position is obtained it will normally be retained against inertia forces which may tend to change the adjusted position of the nut at a time when the bolt has been withdrawn therefrom. Also this frictional restraint will serve to retain the nut in adjusted position relative to the structure to which it is secured against the force of gravity in the case of a nut secured to a surface which is in other than a horizontal plane.

A somewhat different arrangement is illustrated in Figs. 3 and 4, wherein the anchor nut illustrated is of the same construction as that previously described.

In the present instance however, the fastening means is resilient rather than rigid and the resiliency of the fastening means is depended upon to provide the necessary friction for restraining complete freedom of movement of the nut in its limited sphere of movement relative to the part to which it is fastened.

In this embodiment the rivets 42, one of which is shown in Fig. 4, are shouldered as at 44 to fix the extent to which the shank portion of the rivet may be forced through the opening in the part to which the rivet is secured. Between the head of the rivet and the flange portion or lugs 24 of the nut a resilient member is interposed which advantageously may be in the form of a dished metal washer 46. The opening in the washer may be made of such size that the washer will slide freely on the rivet or, as illustrated in the figure, may advantageously be crimped into a groove or other recess under the head of the rivet so that the rivet and washer may remain together as an assembled unit. The length of the shank portion of the rivet, between the head and the shoulder 44, and the shape of the resilient member 46, are made so that when the rivet is in fixed position, as shown in Fig. 4, the resilient member will be slightly flexed to provide the desired frictional restraint against lateral movement of the nut.

While for purposes of illustrating the invention, the most usual type of anchor nut, that is the type having two oppositely extending lugs, has been illustrated, it will be evident that the invention is equally applicable to other specific shapes of anchor nuts.

If only one lug is employed the aperture in the lug and the cross section of the portion of the shank of the rivet between the head and the shoulder may be made noncircular to prevent the nut from turning to an unlimited extent around the rivet as a center. Obviously two rivets passing through the same lug may be used to prevent such turning of a one lug nut and in some cases the frictional restraint imposed by one rivet passing through a single lug may be sufficient.

Also, while perforations of the kind illustrated for the passage of the fastening means through the flange portion of the nut are in most instances to be preferred, the apertures in the flange portion of the nut may obviously be in communication with the outer perimeter of the flange portion. The term aperture as herein employed is therefore not to be limited in its meaning to perforations having continuous closed perimeters. For example, instead of the circular openings 28 and 30 one or more of the openings may be in the form of an open ended slot as indicated at 48 in Fig. 3.

Further, it will be appreciated that specific forms of fastening elements other than the rivet construction or rivet and washer construction shown by way of example, may be employed within the scope of the invention, which is to be understood as embracing all structure falling within the scope of the appended claims when they are construed as broadly as is consistent with the state of the prior art.

What is claimed is:

1. In combination, an anchor nut having a main body portion and a laterally projecting apertured flange portion, a member to which said flange is attached, attaching means passing through apertures in said flange and said member for attaching said flange to said member, said attaching means having sufficient clearance in said flange aperture to permit said nut to have limited lateral movement with respect to said member and said attaching means, said attaching means including friction applying means effective on said flange to restrain said movement of said nut without limiting the extent of said movement.

2. In combination, an anchor nut having a main body portion and a laterally projecting apertured flange portion, a member to which said flange is attached, attaching means passing through apertures in said flange and said member for attaching said flange to said member, said attaching means having sufficient clearance in said flange aperture to permit said nut to have limited lateral movement with respect to said member and said attaching means, said attaching means including resilient pressure applying means effective on said flange to restrain said movement of said nut without limiting the extent of said movement.

3. In combination, an anchor nut having a main body portion and a laterally projecting apertured flange portion, a member to which said flange is attached, attaching means passing through apertures in said flange and said member for attaching said flange to said member, said attaching means including a shank portion passing through said flange aperture and a head portion engaging the exposed face of said flange, said shank portion being sufficiently less in cross section than said flange aperture to provide substantial clearance for said shank portion in said flange aperture to permit said nut to have limited lateral movement with respect to said member and said attaching means, said shank portion having a shouldered portion to provide an abutment engaging the surface of said member, the distance from the point at which said head portion engages the face of said flange to said shouldered portion of said shank being so related to the thickness of said flange that any clamping action of said fastening means on said flange will be effective only to restrain said movement of said nut without limiting the extent of said movement.

DANIEL C. HUNGERFORD.